United States Patent Office 3,741,803
Patented June 26, 1973

3,741,803
METHOD FOR THE PRODUCTION OF FOG-RESISTANT THERMOFORMED STRUCTURES
William J. Clayton, Fairport, N.Y., assignor to Mobil Oil Corporation
No Drawing. Continuation-in-part of abandoned application Ser. No. 799,527, Feb. 14, 1969. This application Apr. 12, 1971, Ser. No. 133,406
Int. Cl. B32b 27/30, 27/32
U.S. Cl. 161—247                    5 Claims

ABSTRACT OF THE DISCLOSURE

The present invention relates to a method for the production of coated structures adapted for thermoforming into structures such as support structures for the containment of moisture emitting products, such as fresh meat or produce for example, the tendency of said structures to fog or become hazy as a result of water condensation in the form of droplets on the surface thereof being substantially reduced or completely eliminated.

CROSS REFERENCE TO RELATED APPLICATIONS

The present application is a continuation-in-part application of U.S. Ser. No. 799,527, now abandoned, filed Feb. 14, 1969.

BACKGROUND OF THE INVENTION (I) Field of the invention

The present invention relates to a method of coating thermoplastic sheet stock with anti-fog formulations which stock is subsequently subjected to a thermoforming operation to form a support container such as, for example, covers such as container lids, meat or produce support trays or other container structures. The anti-fog coating composition has been found to be particularly suitable for application to sheet stock which is to be thermoformed whereby, in addition to its ability to withstand degradation at thermoforming temperatures so that its anti-fog properties are retained in the finished thermoformed structure, the coating compositions additionally provide a surface on the formed structure which has release properties, i.e. such coatings facilitate the separation of individual structures when such structures are nested or stacked together.

(II) Description of the prior art

In the past, numerous surfactants and solutions thereof have been applied to the surface of preformed thermoplastic materials which are to be employed in the overwrap packaging of moisture emitting products, such as fresh meat for example. Such prior art coatings have been effective in reducing the tendency of the hydrophobic surface of the thermoplastic material in contact with the moisture emitting product from fogging or becoming hazy. Such coatings, which usually contain surfactants or wetting agents, cause the surface of the overwrap material to become hydrophilic, resulting in the condensed moisture which collects on the surface thereof to wet-out on the film surface, thereby eliminating individual droplet formations and attendant fogging. It has been found, however, when the prior art anti-fog coating formulations are applied to the surface of thermoplastic sheet stock which is subsequently subjected to thermoforming operations, that the temperatures to which such coating is exposed during the thermoforming step results in a degradation or decomposition of the effective components, i.e., surfactant, of the coating whereby when such trays are formed, either the anti-fog formulation is no longer effective in achieving the desired result when such trays are employed in packaging operations, i.e., reducing the tendency of such trays to become foggy and haze up when exposed to moisture emitting products; or, conversely, as the trays are thermoformed, a degradation of the prior art anti-fog coating formulations occurs which results in a frosted appearance being imparted to the bottom of the tray whereby said tray bottoms become translucent or opaque. The latter is highly undesirable in that it destroys the prime advantage realized in the employment of transparent thermoplastic trays for packaging, i.e., the "see through" feature of such trays when products are contained therein, whereby the consumer may visually inspect the undersurface of a product packaged in such a tray with transparent overwrap materials, e.g., cellophane, polyethylene and the like, which are normally employed to retain products on the tray.

SUMMARY OF THE INVENTION

In accordance with the present invention, anti-fog coating formulations, adapted for application to transparent thermoplastic sheet material have been discovered which, when applied prior to formation of such sheet into containers, or container covers, adapted for the containment of moisture emitting products, such anti-fog coating formulations are able to withstand the requisite thermoforming temperatures. Accordingly, not only are the resultant structures characterized by having anti-fog properties, but additionally there is no tendency for haze or frost formation developing on the tray surface during the forming application as a result of either thermal degradation of the anti-fog coating material or reaction of such coating with the sheet being coated at the thermoforming temperature. In particular, applicants have found that when coating formulations, comprising a relatively high boiling point solvent material such as a polyhydric alcohol, e.g., glycerin, combined with a surfactant material such as, for example, a polyoxyethylene sorbitan monooleate, are applied to the surface of transparent thermoplastic sheet stock from an aqueous alcoholic solution, anti-fog properties are imparted to the resultant products which are thermoformed from the sheet stock, without the attendant disadvantages of the prior art anti-fog coating solutions and cotaed products referred to above.

DESCRIPTION OF SPECIFIC EMBODIMENTS

As hereinbefore discussed, the present invention relates to a method of imparting anti-fog properties to thermoformed structures utilizing anti-fog coating compositions adapted for application to the surface of thermoplastic sheet material. In particular, such anti-fog coating compositions are particularly suited for application to sheet material which is to be subsequently thermoformed to form a container structure adapted for the packaging of moisture emitting products. In the past, such products have been packaged in a wide variety of trays such as, for example, molded pulp trays or, more recently, thermoplastic foam trays such as, for example, polystyrene foam. It will be obvious when such prior art trays are used to support products which may be then overwrapped with transparent wrapping material such as cellophane or polyethylene, for example, that there would be no need for the employment of anti-fog coating formulations on the tray itself, which is opaque. In the past, anti-fog coating formulations which have been developed and disclosed in the prior art are primarily, in the packaging art, intended for application to relatively thin thermoplastic sheet materials which are intended for use in the overwrap packaging of moisture emitting products, whereby such coating prevents the tendency of the normally hydrophobic film from becoming hazy and fogging up as a result of water droplet condensation on the surface thereof. Now, however, with the advent of support trays for packaging which are fabricated from transparent thermoplastic sheet, the consumer may view the contents of the package, not only through the transparent film overwrap material, but additionally the undersurface of the encased product may be viewed through the transparent support tray. Such transparent support trays when formed of thermoplastic materials, as in the case of the thin, transparent thermoplastic overwrap film, also have a tendency to fog up and become hazy when they are exposed to, or support, moisture emitting products, whereby the transparency of such trays is either substantially reduced or completely eliminated.

Applicant has found that, from the standpoint of effectiveness, economy and ease of high-speed commercial production, anti-fog coating formulations must be applied to the surface of such transparent support trays before the trays themselves are formed, i.e., to the surface of the transparent sheet stock prior to the tray-forming operation. During the tray-forming operation, conventional thermoforming techniques are employed to form the tray, whereby the surface of the sheet stock which has been coated with the anti-fog coating formulation may be exposed to requisite forming temperatures on the order of from about 250° F. up to about 350° F. when thermoplastic materials such as, for example, polystyrene sheet stock on the order of from about 5 mils up to about 15 mils is employed to produce the transparent tray structure. In many instances, such trays when they are formed are characterized by having a nonplanar bottom, for example, the bottom surface of such trays may contain elevations and depressions for a number of reasons such as, for example, to maintain a greater portion of the meat surface out of contact with the tray bottom and to allow for circulation of air between the interface of the meat with the tray bottom, whereby the bloom or coloration of the meat product is preserved and protected for substantial periods of time. It will be obvious that difficulties would be encountered in attempting to apply a uniform coating of anti-fog material to the inner surface of such irregular, non-planar tray bottoms after the trays had been formed.

Applicant found that when employing the anti-fog coating formulations of the prior art to coat the unformed transparent thermoplastic sheet stock, and when the sheet was subsequenly thermoformed, thermal degradation of the anti-fog coating composition resulted, and additionally, in some instances, a haze or frost-like appearance formed on the bottom of the formed tray which could not be removed, i.e., it was an integral part of the surface of the tray bottom. Obviously, therefore, the prior art anti-fog coating formulations adapted for employment on relatively thin thermoplastic film which is to be used in overwrap packaging applications and not subjected to the temperatures encountered in the thermoforming of trays discussed hereinabove are completely unsuitable for employment as anti-fog coating formulations for sheets which are to be thermoformed to produce transparent thermoplastic support trays.

Applicant has now found that, when commercially available surfactants are dissolved in a relatively high boiling solvent, e.g., a solvent characterized by having a boiling point above the temperatures employed in tray-forming operations, and such a solution is applied to the surface of transparent thermoplastic sheet stock such as polystyrene, such a composition has no tendency to degrade at requisite thermoforming temperatures, and additionally eliminates the formation of any haze or frost on the bottom surface of the tray when it is formed. Applicant has found that such compositions may be applied to the surface of the transparent sheet material prior to formation thereof in the form of a solution in a volatile solvent such as water or a lower alcohol such as ethyl alcohol or ispropanol or a water-alcohol mixture, in which case the solvent merely serves to distribute the composition over the surface to which it is applied, then rapidly evaporates, leaving the thin film of the glycerin-surfactant solution extending over the surface. When the composition is applied to the surface of the transparent thermoplastic sheet stock in the form of such a solution, the total solids content of the solution may vary from about 3% to 30% by weight or more depending on the method of coating application and desired coating thickness.

As hereinbefore noted, a combination of surfactant and high boiling point solvent for such surfactant which has been found to be particularly suitable when polystyrene film is employed in the tray-forming operation has been found to be a mixture comprising glycerin as the high boiling solvent and polyoxyethylene sorbitan monooleate as the surfactant material. Additionally, when glycerin is employed as the high boiling solvent for the surfactant, applicant has found that the resulting tray, by virtue of the presence of the thin coating of glycerin on the inner surface of the tray bottom, exhibits improved denesting properties, i.e., facility of separation of one tray from another, when such trays are dispensed from an internested stack of trays.

Particularly preferred concentrations of the polyhydric alcohol, such as glycerin, with the surfactant, such as polyoxyethylene sorbitan monooleate, have been found to be from about 40% to about 100% by weight of polyhydric alcohol based upon the total weight of surfactant present. In particular, it has been found that it is desirable to employ at least about 50% by weight of polyhydric alcohol based upon the total weight of said surfactant admixed therewith. When less than about 40% glycerin is employed in the anti-fog coating formulation, i.e., glycerin concentrations on the order of about 33% or less by weight based on total weight of surfactant, the tendency of the trays to become frosted or hazy during the thermoforming operation is not eliminated. An increase in the glycerin content above the preferred percentage, i.e., above about 50% by weight based upon the total weight of the surfactant, is desirable from a denesting viewpoint, whereby increased amounts of glycerin facilitate ease of removal of one tray from another when said trays are stacked together. However, excessive amounts of glycerin, i.e., on the order of above about 100% by weight based on the total weight of the surfactant, have been found to be undesirable from the standpoint of the greasy and slippery feel imparted to the final tray product and the excessive amounts of undesirable smoke produced during the tray-forming operation.

When aqueous solutions of lower alkyl alcohols, e.g., isopropanol, are employed as a media for application of the anti-fog coating formulations of the present invention, a preferred alcohol concentration range has been found to be from about 15 up to about 50% by weight based on the total weight of coating solution, and preferably from about 15 to about 30% by weight.

When the anti-fog coating materials of the present invention are applied to the surface of the transparent thermoplastic sheet stock from a solvent media as hereinbefore discussed, such as water-alcohol solvents, for example, the total solids content of anti-fog coating in solution is dependent upon the desired thickness of the wet coat applied to the sheet surface which in turn depends upon the method of application used. In a specific embodiment of the present invention, it has been found desirable to apply a wet coating thickness on the order of about 0.25 mil to the surface of the transparent sheet stock which results in an optimum dried anti-fog coating thickness on the final tray product of from about 0.005 to about 0.01 mil. When this dried thickness is reduced below 0.005 mil, there is a tendency for the coated tray structures to exhibit relatively poor anti-fogging characteristics when they are employed to package moisture emitting products. It has been found that any one of a number of standard coating techniques may be employed to coat the thermoplastic sheet stock with the anti-fog coating formulation of the present invention including spraying the sheet with a standard lacquer-type spray gun, for example. When such a coating application technique is employed, a solids concentration of 9%, e.g., 6% surfactant and 3% polyhydric alcohol, has been found effective in producing an adequate thickness of an anti-fog coating on the final tray product. In cases where gravure rollers are utilized for coating application to the thermoplastic film stock, a total solids concentration of 3% by weight, i.e., 2% surfactant and 1% polyhydric alcohol, has been found to be effective in producing the desired wet coating thickness of about 0.25 mil.

A particularly preferred method of coating application utilizes a coating roller, which is a smooth roller. When using a smooth roller to apply the coating composition of the present invention to the surface of the thermoplastic film, a total solids concentration of about 30% has been found to be effective in producing a preferred dry coating thickness of about 0.005 mil.

EXAMPLE I

An oriented polystyrene sheet approximately 10 mils thick was coated on one side thereof utilizing a smooth coating roller. The coating composition was a 30% solids solution comprising 20% polyoxyethylene sorbitan monooleate, identified by the manufacturer as Tween-80; 10% glycerin; 17.5% isopropyl alcohol; and 52.5% water. The coating was applied to the film surface to give a wet coating thickness of about 0.015 mil, and the coated sheet was subsequently dried by passage through an air oven operated at a temperature of about 160° F. The coated sheet had a total residence time in the oven of approximately 8 seconds. The resultant dried, coated, oriented polystyrene sheet had a dried coating thickness of approximately 0.005 mil. The one-side coated sheet was passed into a standard vacuum thermoformer wherein the coated side of the oriented polystyrene sheet was preheated by contact with a heated platen maintained at a temperature of about 280° F. Following a contact time with the heated platen of approximately 1.25 seconds, the preheated polystyrene was immediately vacuum drawn into a tray-forming mold. Upon separation from the mold, the resultant tray appeared crystal clear, exhibiting excellent optical properties. The tray showed no signs of fogging when exposed to water vapor at either low or high temperatures, i.e., no water droplet formation occurred on the interior surface of the tray. The tray was further characterized in that, when a series of such trays were nested together, individual trays were easily removed, i.e., the trays denested easily as a result of the presence of the glycerin on the interior surface of the tray which acted as a release agent for the tray.

EXAMPLE 2

Oriented polystyrene base stock identical to that employed in Example 1 was coated, utilizing the identical coating procedure of Example 1 with a coating solution having a 20% total solids concentration and comprising 20% polyoxyethylene sorbitan monooleate; 20% isopropyl alcohol; and 60% water. The coated sheet was formed into a tray utilizing the identical tray-forming operation as described in Example 1. The resultant tray was characterized by having many frosted areas on the interior surface of the bottom thereof which substantially destroyed the desired transparency of the tray bottom. When this tray was subjected to water vapor at both high and low temperatures, the tray fogged, i.e., water droplet condensation on the interior surface of the tray further detracted from the desired transparency; and further, the denesting properties of the tray were unsatisfactory in that, when such trays were stacked together, difficulties were encountered when attempts were made to remove individual trays from such a stack.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims. For example, although the description of specific embodiments primarily emphasizes the advantages of tray structures coated in accord with applicant's method, other structures such as transparent thermoformed containers of various shapes and sizes, as well as container covers or lids, are within the scope of the present invention.

What is claimed is:

1. A transparent thermoformed structure, said structure being characterized by having a coating on at least the inner surface thereof applied prior to thermoforming said thermoformer structure, said coating comprising glycerin and a surfactant dissolved therein, said glycerin being present in an amount of from about 40% to less than about 100% by weight based upon the total weight of said surfactant.

2. The coated structure as defined in claim 1 wherein said coating surfactant is a polyoxyethylene sorbitan monooleate.

3. The coated structure as defined in claim 1 wherein said glycerin comprises about 50% by weight of said coating based upon the total weight of said surfactant.

4. The structure as defined in claim 1 wherein said coating comprises about two-thirds by weight of said polyoxyethylene sorbitan monooleate and about one-third by weight glycerin.

5. A method for the production of fog resistant, transparent, thermoplastic structures which comprises uniformly applying to the surface of a planar thermoplastic sheet an aqueous alcoholic solution of a mixture of glycerin and polyoxyethylene sorbitan monoolate to form a coated sheet, thermoforming said coated sheet to produce a thermoformed structure, the surface of said structure being fog resistant when it is exposed to or is in contact with moisture emitting products.

References Cited

UNITED STATES PATENTS

| | | | |
|---|---|---|---|
| 3,415,661 | 12/1968 | Sincock | 106—13 X |
| 3,212,909 | 10/1965 | Leigh | 106—13 |
| 3,022,178 | 2/1962 | Park et al. | 106—13 |
| 3,306,755 | 2/1967 | Sincock et al. | 106—13 X |
| 2,414,074 | 1/1947 | Vitalis | 106—13 |
| 2,726,962 | 12/1955 | Iorio | 106—13 |
| 3,222,191 | 12/1965 | Steiner et al. | 106—13 X |
| 3,355,313 | 11/1967 | Easters | 106—13 X |
| 3,350,314 | 10/1967 | Dawtrey et al. | 106—13 X |

FOREIGN PATENTS

| | | | |
|---|---|---|---|
| 460,543 | 1/1937 | Great Britain | 106—13 |

GEORGE F. LESMES, Primary Examiner

W. R. DIXON, Jr., Assistant Examiner

U.S. Cl. X.R.

99—171 MP, 171 CA, 171 LP; 106—13; 264—134; 117—138.8 UA